United States Patent [19]

Uetake et al.

[11] Patent Number: 4,827,792
[45] Date of Patent: May 9, 1989

[54] TRANSMISSION SHIFT CONTROL MECHANISM

[75] Inventors: Masami Uetake; Toshiaki Takada, both of Sagamihara, Japan

[73] Assignee: Nissan Motor Co., Ltd., Japan

[21] Appl. No.: 190,337

[22] Filed: May 5, 1988

[30] Foreign Application Priority Data

May 8, 1987 [JP] Japan .................. 62-111728

[51] Int. Cl.$^4$ .................. G05G 9/12; G05G 5/06; G05G 7/04
[52] U.S. Cl. .................. 74/473 R; 74/106; 74/475; 74/517
[58] Field of Search .................. 74/473 R, 475, 106, 74/517

[56] References Cited

U.S. PATENT DOCUMENTS 4,228,693 10/1980 Kelbel .................. 74/473 R X
4,495,832 1/1985 Hiraiwa et al. .................. 74/473 R X
4,497,216 2/1985 Kawamoto .................. 74/473 R X
4,510,817 4/1985 Kawamoto et al. .................. 74/473 R X

FOREIGN PATENT DOCUMENTS 60-81541 5/1985 Japan .

Primary Examiner—Allan D. Herrmann
Attorney, Agent, or Firm—Leydig, Voit & Mayer

[57] ABSTRACT

A reverse shift mechanism includes a reverse shift bracket which is reciprocatively movable between a neutral position and a reverse shifting position in response to shift effort applied thereto from a control lever. During movement of the reverse shift bracket from the neutral position to the reverse shifting position, shift effort is transmitted directly from the reverse shift bracket to a reverse fork lever by way of a direct pin, reducing friction loss and transmission loss and reducing the effort required for shifting. During movement of the shift bracket from the reverse shifting position to the neutral position, the reverse fork lever is drivingly connected to the reverse shift bracket by way of a reverse shift plate and a reverse shift arm. While the reverse shift bracket is in the reverse shifting position, the mechanism is prevented from slipping out of reverse by a stopper pin which engages a stopper pin engaging portion of the reverse shift plate.

8 Claims, 7 Drawing Sheets

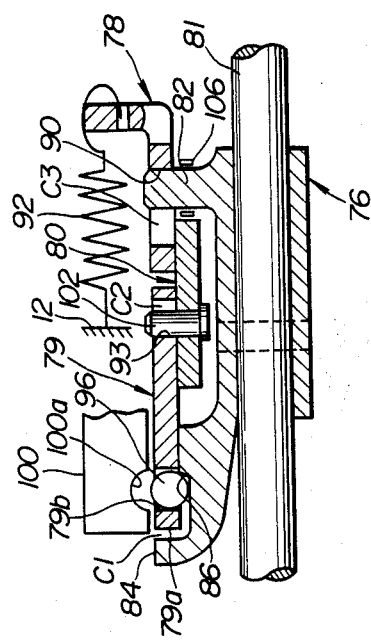
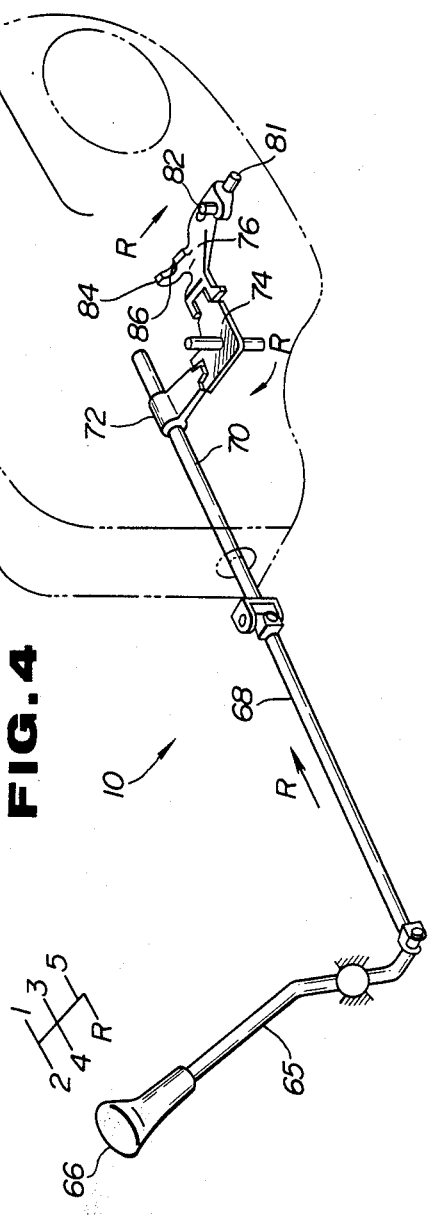

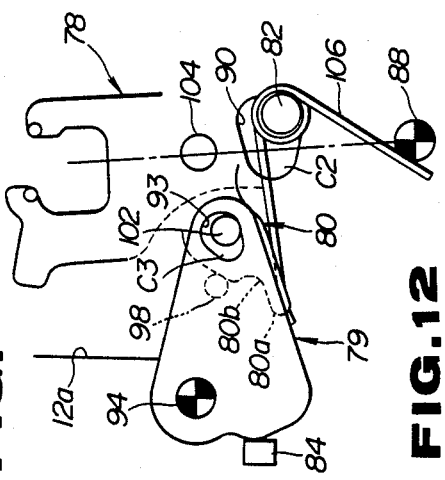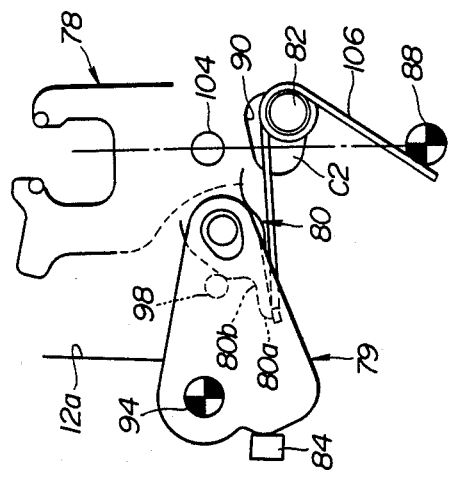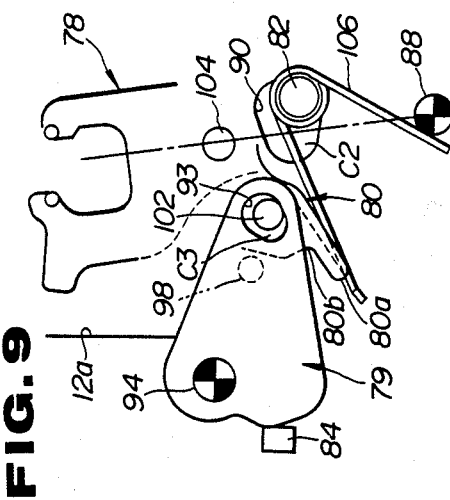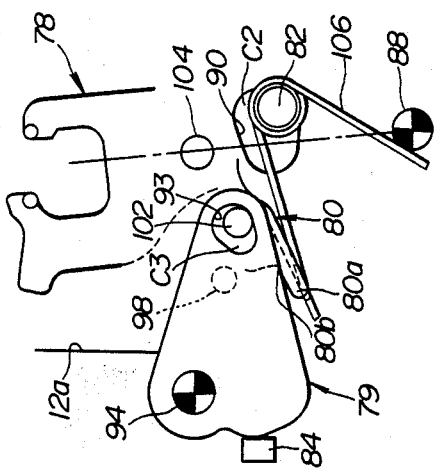

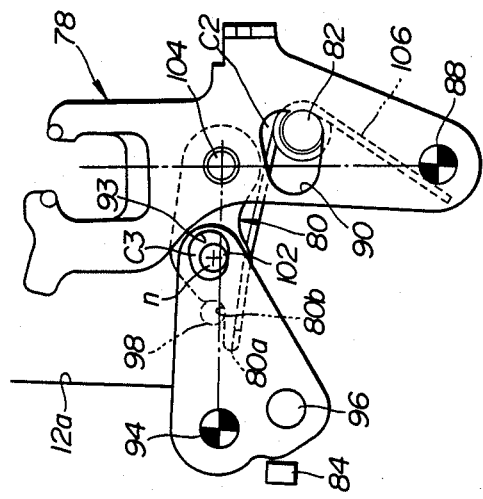
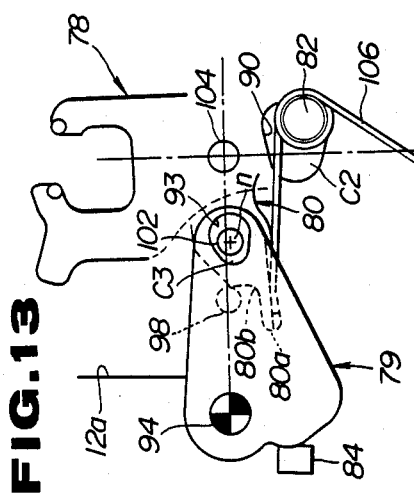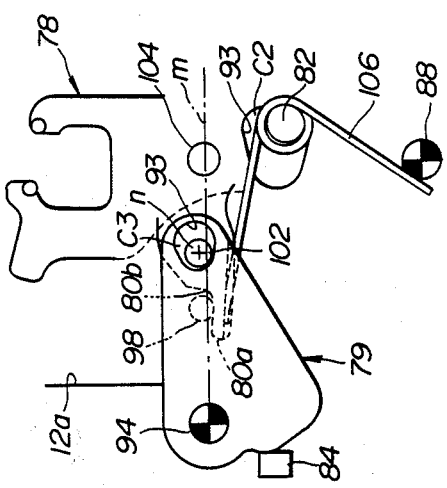

TRANSMISSION SHIFT CONTROL MECHANISM

BACKGROUND OF THE INVENTION

1. Field of the Invention

The present invention relates in general to a shift control mechanism for an automotive manual transmission.

2. Description of the Prior Art

A known reverse shift mechanism consists of a reverse shift bracket, reverse fork lever, reverse shift arm and a reverse shift plate, which are joined to constitute a linkage as disclosed in Japanese Provisional Patent Publication No. 60-81541.

The reverse shift bracket is reciprocatively movable between a neutral position and a reverse shifting position in response to shift effort applied to a control lever. The reverse fork lever is engaged with a reverse idler gear and rotatable about a stationary pin for moving the reverse idler gear between a neutral position and a reverse shifting position. The reverse shift arm is adapted to receive shift effort from an input finger of the reverse shift bracket to rotate about a stationary pin. The reverse shift plate has an end rotatably connected at an end to the reverse shift arm by a movable pin and the other end connected to the reverse fork lever by a movable pin.

The prior reverse shift mechanism has a disadvantage that it is low in transmission efficiency and therefore requires relatively large shift effort, particularly at the instant meshing the reverse idler gear with the reverse main gear and the reverse input gear. This is because during movement of the revese shift bracket from the neutral position to the reverse shifting position, shift effort is transmitted from the input finger of the reverse shift bracket to the reverse shift arm and from which it is transmitted to the reverse fork lever through the reverse shift plate, whereby to move the reverse fork lever from the neutral position to the reverse shifting position.

In order to attain a higher transmission efficiency, it is readily considered to transmit shift effort from the reverse shift bracket to the reverse fork lever directly. This however causes another problem that the transmission is likely to slip out of reverse since the linkage cannot serve as means for preventing such slipping.

SUMMARY OF THE INVENTION

In accordance with the present invention, there is porovided an improved transmission shift control mechanism.

The shift control mechanism comprises a shift bracket reciprocatively movable between a neutral position and a shfiting position, a fork lever rotatable about a first stationary pin, a shift arm rotatable about a second stationary pin, a shift plate having an end rotatably connected to the fork lever by a first movable pin and the other end rotatably connected to the shift arm by a second movable pin, a direct pin secured to the shift bracket and engaged with the fork lever in such a way as to transmit shift effort from the shift bracket to the fork lever directly during overall movement of said shift bracket from the neutral position to the shift position, input means provided to the shift bracket for imparting a rotational movement to the shift arm in a later part of movement of the shift bracket from the neutral position to the shifting position, the first movable pin being located on one of the sides divided by a line interconnecting the second stationary pin and the second movable pin when the shift bracket is in the shifting position, clearance means for providing a clearance between the first movable pin and the shift arm at the end of movement of the shift bracket from the neutral position to the shifting position and thereby making the first movable pin movable into the other of the sides devided by the above mentioned line, stopper means for holding the shift arm and the shift plate in such a relationship that the first movable pin is located on the other of the sides devided by the above mentioned line, and biasing means for urging the shift plate in a predetermined direction and thereby moving the first movable pin from the above mentioned one side into the above mentioned other side at the end of movement of the shift bracket from the neutral position to the shifting position.

In accordance with the present invention, there is further provided an improved reverse shift mechanism for a transmission having a reverse idler gear.

The reverse shift mechanism comprises a reverse shift bracket reciprocatively movable between a neutral position and a reverse shifting position, a reverse fork lever engaged with the reverse idler gear and rotatable about a first stationary pin, a reverse shift arm rotatable about a second stationary pin, a reverse shift plate having an end rotatably connected to the reverse fork lever by a first movable pin and the other end rotatably connected to the reverse shift arm by a second pin, a direct pin secured to the reverse shift bracket and engaged with the reverse fork lever in such a way as to transmit shift effort from the reverse shift bracket to the reverse fork lever directly during overall movement of the reverse shift bracket from the neutral position to the reverse shifting position, first clearance means for providing between the direct pin and the fork lever a clearance that drivingly disconnects the direct pin from the fork lever during movement of the shift bracket from the shifting position to the neutral position, input means provided to the reverse shift bracket for imparting a rotational movement to the reverse shift arm in a later part of movement of the reverse shift bracket from the neutral position to the reverse shifting position, the first movable pin being located on one of the sides divided by a line interconnecting the second stationary pin and the second movable pin when the reverse shift bracket is in the reverse shifting position, second clearance means for providing a clearance between the first movable pin and the reverse shift arm at the end of movement of the reverse shift bracket from the neutral position to the reverse shifting position and thereby making the first movable pin movable into the other of the sides divided by the above mentioned line, stopper means for holding the reverse shift arm and the reverse shift plate in such a relationship that the first movable pin is located on the other of the sides divided by the above mentioned line, and biasing means for urging the reverse shift plate in a predetermined direction and thereby moving the first movable pin from the above mentioned one side into the above mentioned other side at the end of movement of the reverse shift bracket from the neutral position to the reverse shifting position.

The above structure is effective for solving the above noted problem without impairing the function of preventing the transmission from slipping out of the gear.

It is accordingly an object of the present invention to provide an improved transmission shift control mechanism which can reduce shifting effort required, particularly when shifting to reverse, without causing any problem such as a problem of slipping out of gear of transmission.

BRIEF DESCRIPTION OF THE DRAWINGS

FIG. 2 is a sectional view taken along the line II—II of FIG. 1;

FIG. 4 is an overall perspective view of the reverse shift mechanism of FIG. 1;

FIGS. 5 to 15 are views of various operating conditions of the revere shift mechanism of FIG. 1.

DESCRIPTION OF THE PREFERRED EMBODIMENT

Referring to FIGS. 1 to 16, the present invention is by way of example embodied in a reverse shift mechanism 10 for a 5-speed manual transmission for a transversely mounted front-engine front-drive vehicle.

Figure 3:
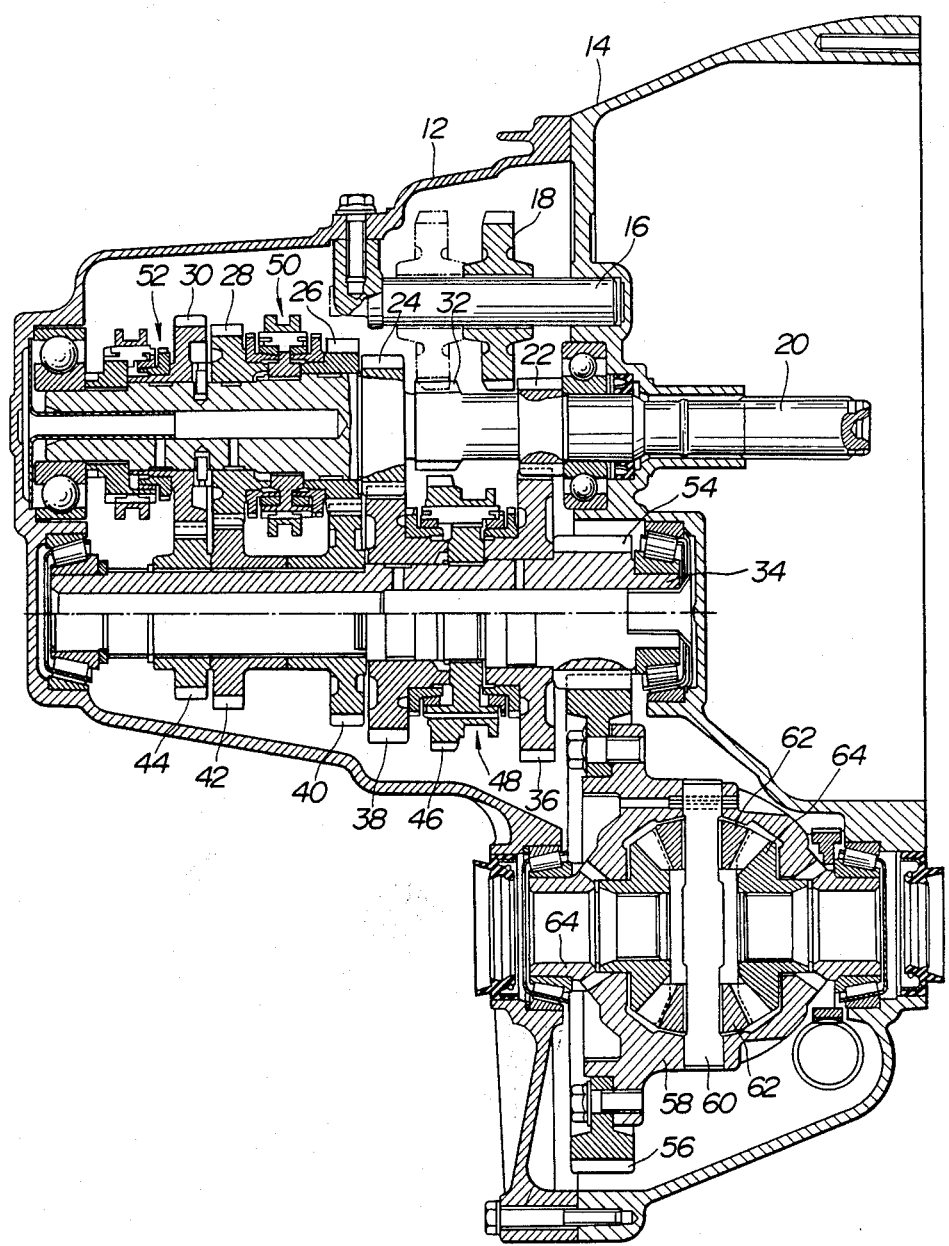
FIG. 3 is a sectional view of a transmission incorporating the reverse shift mechanism of FIG. 1.

As shown in FIG. 3, the transmission incorporating the reverse shift mechanism 10 consists of a transmission case 12, clutch housing 14, idler gear shaft 16, reverse idler gear 18, input shaft 20, 1st input gear 22, 2nd input gear 24, 3rd input gear 26, 4th input gear 28, 5th input gear 30, reverse input gear 32, main shaft 34, 1st main gear 36, 2nd main gear 38, 3rd main gear 40, 4th main gear 42, 5th main gear 44, reverse main gear 46, 1st and 2nd synchronizer 48, 3rd and 4th synchronizer 50, 5th synchronizer 52, output gear 54, final drive gear 56, differential case 58, pinion mate shaft 60, pinion mate gears 62 and side gears 64.

Although the reverse idler gear 18 in FIG. 3 is shown in a position incapable of meshing the reverse main gear 46, this is for the purpose of illustration only but the reverse idler gear 18 is actually arranged in a position capable of meshing both the reverse input gear 32 and the reverse main gear 46 at the same time.

The reverse idler gear 18 is movable between a reverse shifting position and a neutral position under control of the reverse shift mechanism 10 shown in FIG. 4. The reverse idler gear 18 is in mesh with the reverse input gear 32 and the reverse main gear 46 when in the reverse shifting position and out of mesh from same when in the neutral position.

The reverse shift mechanism 10 consists of a control lever 65 with a control knob 66, a control rod 68 connected at an end thereof to the lower end of the control lever 65, a striking rod 70 connected to the other end of the control rod 68, a striking lever 72 fixedly attached to the striking rod 70, a bellcrank control bracket 74 engaged with the striking lever 72, and a reverse shift bracket 76 engaged with the control bracket 74 when the control lever 65 is in a reverse selecting position so that axial movement of the striking rod 70 is translated into axial movement of the reverse shift bracket 76 by way of the control bracket 74.

Figure 1:
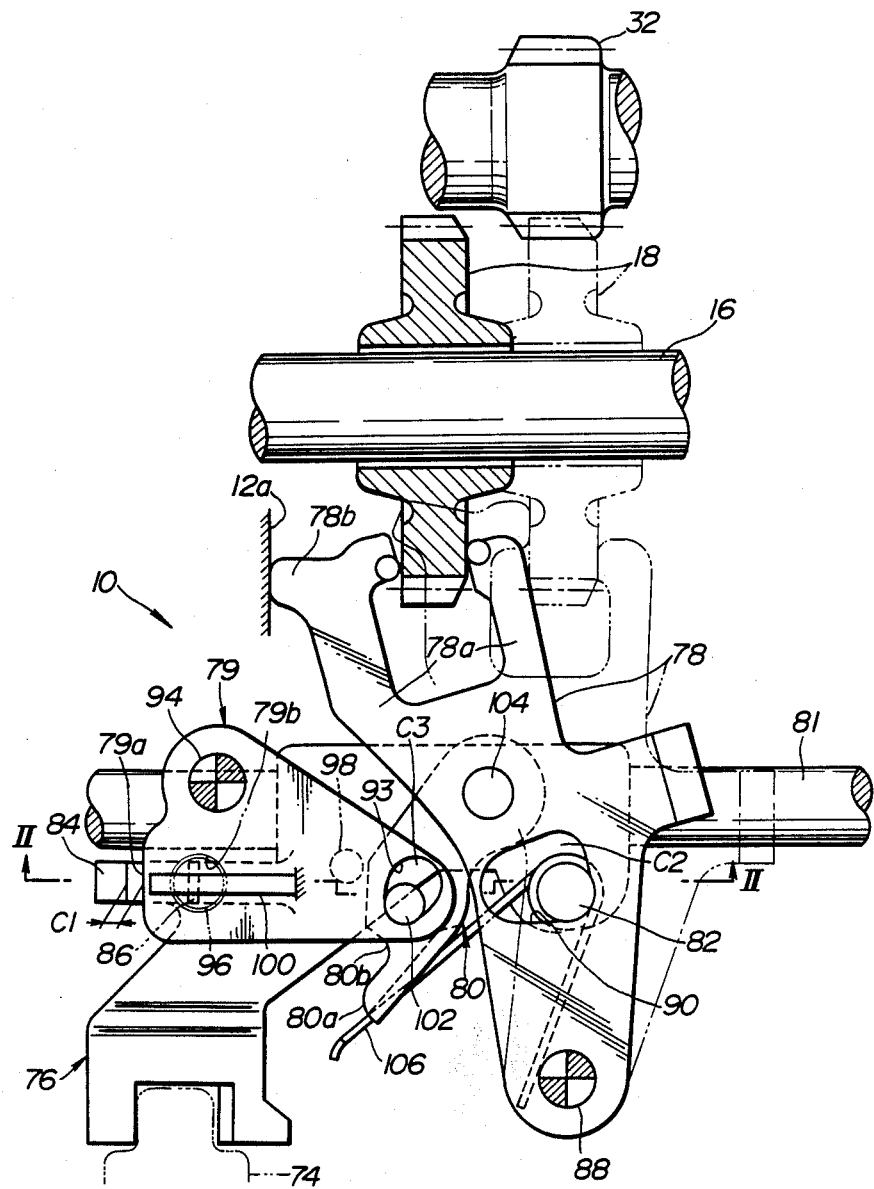
FIG. 1 is a principal portion of a reverse shift mechanism according to an embodiment of the present invention.

A linkage including the reverse shift bracket 76 and provided for connecting the control bracket 74 to the reverse idler gear 18 is omitted in FIG. 4 but constitutes a novel important portion of the present invention and will be described in detail with reference to FIGS. 1 and 2.

The above mentioned linkage of the reverse shift mechanism 10 consists of the reverse shift bracket 76, reverse fork lever 78, reverse shift arm 79 and a reverse shift plate 80.

The reverse shift bracket 76 is an input member of the linkage and reciprocatively movable between a neutral position and a reverse shifting position in order to move the reverse idler gear 18 between the neutral position and the reverse shifting position. The reverse shift bracket 76 is fixedly attached to a bracket rod 81 fitted in the transmission case 12.

The reverse shift bracket 76 has a direct pin 82 through which shift effort is transmitted directly to the reverse fork lever 78 during overall movement of the reverse shift bracket 76 from the neutral position to the reverse shifting position. The reverse shift bracket 76 further has an input finger 84 in such a way as to provide a clearance C1 between an abutting end 79a of the reverse shift arm 79 and the input finger 84 when the reverse shift bracket 76 is in the neutral position so that the reverse shift arm 79 is driven by the input finger 84 a little later than the begining of movement of the reverse shift bracket 76 from the neutral position to the reverse position, i.e., the reverse shift arm 79 is driven by the input finger 84 in a later part of movement of the reverse shift bracket 76 from the neutral position to the reverse shifting position.

The reverse shift bracket 76 further has a ball abutting portion 86 through which shift effort is transmitted to the reverse shift arm 79 during movement of the reverse shift bracket 76 from the reverse shifting position to the neutral position.

The reverse fork lever 78 is shiftingly coupled with the reverse idler gear 18 and rotatable about a first stationary pin 88 to shift the reverse idler gear 18.

The reverse fork lever 78 has at an intermediate portion a particularly profiled hole 90 for receiving therein the direct pin 82. The hole 90 is so profiled as to drivingly connect the direct pin 82 to the reverse fork lever 78 during movement of the reverse shift bracket 76 from the neutral position to the reverse shifting position and to provide between the direct pin 82 and the reverse fork lever 78 a clearance C2 which drivingly disconnects the direct pin 82 from the reverse fork lever 78 during movement of the reverse shift bracket 76 from the reverse shifting position to the neutral position.

The reverse fork lever 78 has a forked end 78a straddling a peripheral portion of the reverse idler gear 18 for thereby being drivingly coupled with same. The reverse fork lever 78 further has a location projection 78b adjacent the forked end 78a. The location projection 78b is operative to locate the reverse fork lever 78 in its neutral position when the location projection 78b is in contact with a location face 12a of the transmission case 12. Indicated by the reference number 92 in FIG. 2 is a return spring for urging the reverse fork lever 78 toward the neutral position.

The reverse shift arm 79 is rotatable about a second stationary pin 94 and adapted to be driven in one direction by the input finger 84 in the later part of movement of the reverse idler gear 18 from the neutral position to the reverse shifting position and in the opposite direction by the ball abutting portion 86 of the reverse shift bracket 76 during overall movement of the reverse idler gear 18 from the reverse shifting position to the neutral position.

The reverse shift arm 79 has a ball receiving hole 79b in which a ball 96 is fitted. The ball 96 receives shift effort from the ball abutting portion 86 of the reverse shift bracket 76 during movement of the reverse idler gear 18 from the reverse shifting position to the neutral position. The reverse shift arm 79 further has at the intermediate portion a stopper pin 98 which cooperates with the reverse shift plate 80 as will be described hereinlater at the end of movement of the reverse idler gear 18 from the neutral position to the reverse shifting position.

A stationary ball guiding plate 100 is disposed on one side of the reverse shift arm 79 opposite to the reverse shift bracket 76, i.e., a stationary ball guiding plate 100 is so disposed as to cooperate with the reverse shift bracket 76 to hold therebetween the ball 96. The ball guiding plate 100 has a ball receiving depression 100a which is capable of being aligned with the ball receiving hole 79b to drivingly disconnect the reverse shift bracket 76 from the reverse shift arm 79 when the reverse shift arm 79 is in its neutral position.

The reverse shift plate 80 is rotatably connected at an end to the reverse shift arm 79 via a first movable pin 102 and at the other end to the reverse fork lever 78 via a second movable pin 104. The reverse shift plate 80 therefore serves as a link interconnecting the reverse shift arm 79 and the reverse fork lever 78.

The reverse shift plate 80 is formed with a stopper projection 80a and a pin engaging portion 80b which are engaged with the stopper pin 98 near the end of movement of the reverse idler gear 18 from the neutral position to the reverse shifting position for thereby holding the first movable pin 102 on the reverse idler gear 18 side with respect to the line interconnecting the second stationary pin 94 and the second movable pin 104.

The first movable pin 102 is disposed in a partiuclarly profiled hole 93 of the reverse shift arm 79 in such a way as to form therearound a clearance C3 which allows relative movement of the reverse shift plate 80 and the reverse shift arm 79 in a later part of movement of the reverse shift bracket 76 from the neutral position to the reverse shifting position. In other words, the clearance C3 is operative to hold the reverse shift plate 80 and the reverse shift arm 79 in a condition drivingly disconnected from each other in a later part of movement of the reverse shift bracket 76 from the neutral position to the reverse shifting position.

A torsion coil spring 106 is disposed between the reverse fork lever 78 and the reverse shift plate 80 for urging the reverse shift plate 80 toward the reverse idler gear 18. The spring 106 has a coiled portion 106a fitted on the direct pin 82 and a pair of arm portions 106b and 106c abuttingly engaged with the first stationary pin 88 and the reverse shift plate 80, respectively.

The reverse shift mechanism 10 described as above operates as follows:

In order to shift the transmission to reverse, the control lever 65 is first moved into a reverse & 5th gear selecting position. When this is the case, the reverse shift mechanism 10 is put into an operating condition shown in FIGS. 1 and 5, i.e., the direct pin 82 is located in a lower right-hand portion of the profiled hole 90 in the drawing and drivingly connected thereat with the reverse fork lever 78.

The control lever 65 is then moved toward a reverse shifting position. During movement of the control lever 65 from the reverse and 5th gear selecting position to the reverse shifting position, shift effort applied to the knob 66 of the control lever 65 is transmitted through the control lever 65, control rod 68, striking rod 70, striking lever 72, and the control bracket 74 to the reverse shift bracket 76 and then transmitted from the reverse shift bracket 76 to the reverse fork lever 78 through the direct pin 82, thus driving the reverse idler gear 18 toward the reverse shifting position.

Figure 5:
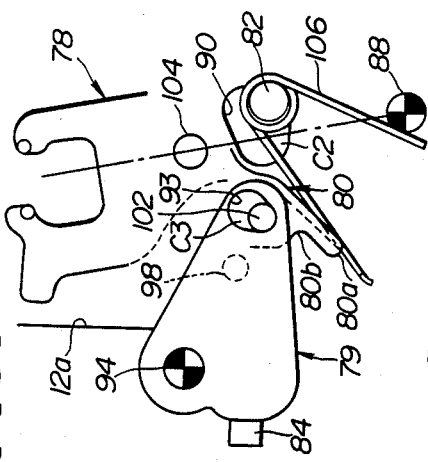
Figure 6:
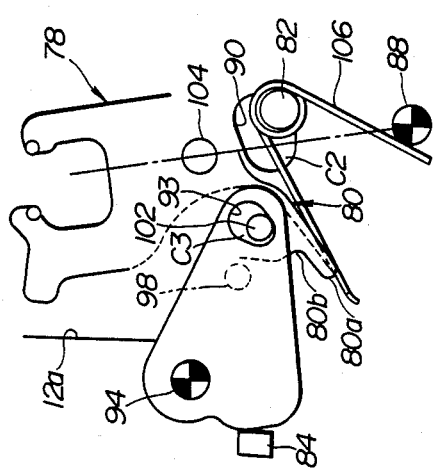
Figure 7:
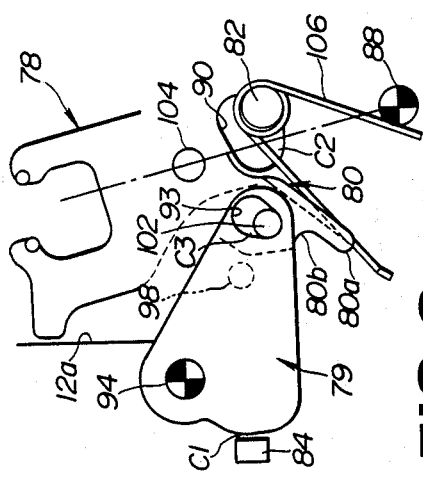
Figure 8:
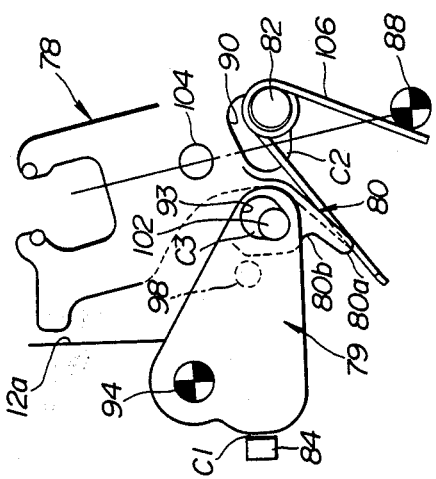
Figure 16:
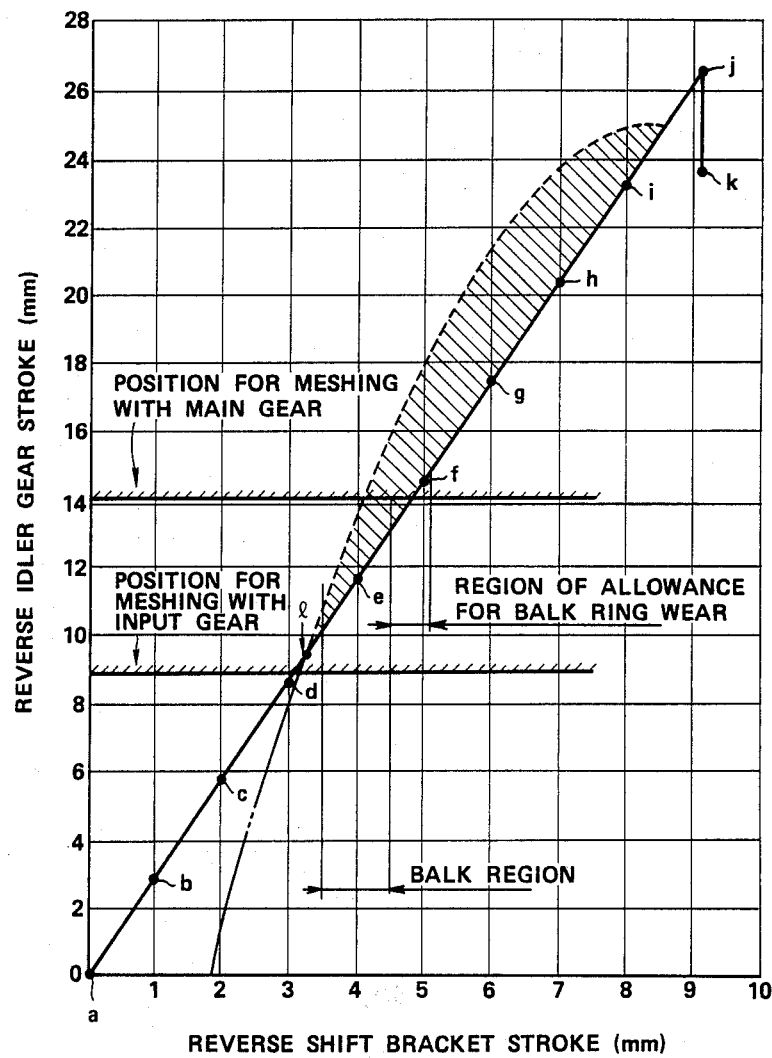
FIG. 16 is a graph showing a relationship in movement between a reverse idler gear and a reverse shift bracket which are utilized in the reverse shift mechanism of FIG. 1.

The reverse shift mechanism 10 is put into operating conditions shown in FIGS. 5 to 15 sequentially as the control lever 65 is increasingly moved from the neutral position toward the reverse shifting position, i.e., FIG. 5 shows an operating condition corresponding to the point "a" in FIG. 16, FIG. 6 shows an operating condition corresponding to the point "b", FIG. 7 shows an operating condition corresponding to the point "c", FIG. 8 shows an operating condition corresponding to the point "d", FIG. 9 shows an operating condition corresponding to the point "e", FIG. 10 shows an operating condition corresponding to the point "f", FIG. 11 shows an operating condition corresponding to the point "g" in FIG. 16, FIG. 12 shows an operating condition corresponding to the point "h" in FIG. 16, FIG. 13 shows an operating condition corresponding to the point "i" in FIG. 16 and FIG. 14 shows and operating condition corresponding to the point "j" in FIG. 16.

In an earlier part of movement of the reverse shift bracket 76 from the neutral position to the reverse shifting position, the clearance C1 between the input finger 84 and the reverse shift arm 79 reduces, and from the point "l" in FIG. 16 onward the reverse shift arm 79 is driven to swing increasingly with increase in movement of the input finger 84. In response to this, the reverse shift plate 80 moves toward the reverse idler gear 18 while rotating due to the provision the clearance C3 (FIG. 16).

At the end of movement of the control lever 65 from the neutral position to the reverse shifting position, the reverse shift mechanism 10 is put into an operating condition shown in FIG. 13 wherein the stopper pin 98 is subject to a biasing force from the spring 106. The stopper pin 98 is thus engaged with the stopper projection 80a under the bias of the spring 106 as shown in FIG. 14, whereby to locate the center "n" of the first movable pin 102 on the reverse idler gear 18 side with respect to the line "m" interconnecting the second stationary pin 94 and the second movable pin 104. Due to the bias of the spring 106, the stopper pin 98 is caused to slide on the stopper projection 80a and engaged with the pin engaging portion 80b while holding the center "n" of the first movable pin 102 on the idler gear 18 side with respect to the line "m" as shown in FIG. 15, thus completing the operation of the reverse shift mechanism 10 for shifting the transmission to reverse.

The reverse idler gear 18 is stroked or displaced maximumly when the reverse shift mechanism 10 is in the operative condition shown in FIG. 14. Transition from the maximumly stroked condition shown in FIG. 14 to the shifting completed condition shown in FIG. 15 is performed only by the bias of the spring 106. By this, the reverse idler gear 18 is caused to return a little towards it neutral position, i.e., cause to move from the position "j" to the position "k" in FIG. 16.

When the tramsmission is to be shifted from reverse to neutral, shift effort is applied on the control lever 65 to return same to the neutral position. The reverse shift bracket 76 is thus driven to move toward the neutral position and causes the ball abutting portion 86 to abut upon the ball 96 which is held in the ball receiving hole 79b by the ball guiding plate 100. Henceforth, shift effort is transmitted from the reverse shift bracket 76 to the reverse shift arm 79 through the ball 96, thus causing the reverse shift arm 79 to swing clockwise in the drawing. When this is the case, the direct pin 82 does not transmit any shift effort to the reverse fork lever 78 since the clearance C2 is provided between the direct pin 82 and the reverse fork lever 78 and holds the same drivingly disconnected from each other during movement of the reverse fork bracket 76 from the reverse shifting position to the neutral position.

When the reverse shift arm 79 returns to its neutral position, the ball 96 is aligned with the ball receiving depression 100a of the ball guiding plate 100 as shown in FIG. 2, thus terminating transmission of shift effort from the reverse shift bracket 76 to the reverse shift arm 79 through the ball 96 and completing the operation of the reverse shift mechanism 10 for shifting the transmission from reverse to neutral.

From the foregoing, it will be understood that during movement of the reverse idler gear 18 from the neutral position to the reverse shifting position, shift effort is transmitted from the direct pin 82 of the reverse shift bracket 76 directly to the reverse fork lever 78 without passing through the reverse shift arm 79 and the reverse shift plate 80, thus making it possible to reduce the friction loss and the transmission loss and perform the shifting work with reduced effort.

It will be further understood that the reverse shift mechanism 10 can assuredly prevent the transmission from slipping out of reverse since if the reverse idler gear 18 in the reverse shifting position is subjected to a force that drives the reverse idler gear 18 toward the neutral position such a force is absorbed by the stopper pin 98 of the reverse shift arm 79 and the stopper pin engaging portion 80b of the reverse shift plate 80 and cannot move the reverse fork lever 78 toward the neutral position. This is because at the end of movement of the reverse idler gear 18 from the neutral position to the reverse shifting position the reverse shift plate 80 is adapted to engage at the stopper pin engaging portion 80b with the stopper pin 98 under the bias of the torsion coil spring 106 so that the first movable pin 102 is placed on the reverse idler gear 18 side with respect to the line interconnecting the second stationary pin 94 and the second movable pin 104, whereby the reverse idler gear 18 in the reverse shifting position cannot move directly toward the neutral position but needs to move a little in the direction opposite to the neutral position at the begining of movement toward the neutral position.

What is claimed is:

1. A transmission shift control mechanism comprising:
    a shift bracket reciprocatively movable between a neutral position and a shifting position;
    a fork lever rotatable about a first stationary pin;
    a shift arm rotatable about a second stationary pin;
    a shift plate having an end rotatably connected to said fork lever by a first movable pin and the other end rotatably connected to said shift arm by a second movable pin;
    a direct pin secured to said shift bracket and engaged with said fork lever in such a way as to transmit shift effort from said shift bracket to said fork lever directly during overall movement of said shift bracket from the neutral position to the shifting position;
    input means provided to said shift bracket for imparting a rotational movement to said shift arm in a later part of movement of said shift bracket from the neutral position to the shifting position;
    said first movable pin being located on one of the sides divided by a line interconnecting said second stationary pin and said second movable pin when said shift bracket is in the shifting position;
    clearance means for providing a clearance between said first movable pin and said shift arm at the end of movement of said shift bracket from the neutral position to the shifting position and thereby making said first movable pin movable into the other of the sides divided by said line;
    stopper means for holding said shift arm and said shift plate in such a relationship that said first movable pin is located on the other of the sides divided by said line; and
    biasing means for urging said shift plate in a predetermined direction and thereby moving said first movable pin from said one side into said other side at the end of movement of said shift bracket from the neutral position to the shifting position.

2. A transmission shift control mechanism as set forth in claim 1, further comprising clearance means for providing between said direct pin and said fork lever a clearance that drivingly disconnect said direct pin from said fork lever during movement of said shift bracket from the shifting position to the neutral position.

3. A transmission shift control mechanism as set forth in claim 2 wherein said input means comprises an input finger abuttingly engageable with said said shift arm and so arranged as to form a clearance between said shift arm and said input finger when said shift bracket is in the neutral position.

4. A transmission shift control mechanism as set forth in claim 1 wherein said stopper means comprises a stopper pin secured to said shift arm and a stopper pin engaging portion provided to said shift plate.

5. A transmission shift control mechanism as set forth in claim 1 wherein said shift arm has a ball and a ball receiving hole in which said ball is fitted, said shift bracket having a ball abutting portion abuttingly engageable with said ball for thereby transmitting shift effort to said shift arm during movement of said shift bracket from the shifting position to the neutral position.

6. A transmission shift control mechansim as set forth in claim 5, further comprising a stationary ball guiding plate which cooperates with said shift bracket to locate therebetween said ball, said ball guiding plate having a depression capable of being aligned with said ball receiving hole when said shift bracket is in said neutral position for thereby drivingly disconnect said shift arm from said shift bracket 7. A transmission shift control mechanism as set forth in claim 1 wherein said biasing means comprises a torsion coil spring having a coiled portion fitted on said direct pin and a pair of arm portions abutted upon said shift plate and said first stationary pin, respectively.

8. A reverse shift mechanism for a transmission having a reverse idler gear, comprising:
    a reverse shift bracket reciprocatively movable between a neutral position and a reverse shifting position;

a reverse fork lever engaged with said reverse idler gear and rotatable about a first stationary pin;

a reverse shift arm rotatable about a second stationary pin;

a reverse shift plate having an end rotatably connected to said reverse fork lever by a first movable pin and the other end rotatably connected to said reverse shift arm by a second pin;

a direct pin secured to said reverse shift bracket and engaged with said reverse fork lever in such a way as to transmit shift effort from said reverse shift bracket to said reverse fork lever directly during overall movement of said reverse shift bracket from the neutral position to the reverse shifting position;

first clearance means for providing between said direct pin and said fork lever a clearance that drivingly disconnect said direct pin from said fork lever during movement of said shift bracket from the shifting position to the neutral position;

input means provided to said reverse shift bracket for imparting a rotational movement of said reverse shift bracket from the neutral position to the reverse shifting position;

said first movable pin being located on one of the sides devided by a line interconnecting said secondary stationary pin and said second movable pin when said reverse shift bracket is in the reverse shifting position;

second clearance means for providing a clearance between said first movable pin and said reverse shift arm at the end of movement of said reverse shift bracket from the neutral position to the reverse shifting position and thereby making said first movable pin movable into the other of the sides devided by said line;

stopper means for holding said reverse shift arm and said reverse shift plate in such a relationship that said first movable pin is located on the other of the sides devided by said line; and biasing means for urging said reverse shift plate in a predetermined direction and thereby moving said first movable pin from said one side into said other side at the end of movement of said reverse shift bracket from the neutral position to the reverse shifting position.

* * * * *